United States Patent [19]

Elabd

[11] Patent Number: 4,575,763
[45] Date of Patent: Mar. 11, 1986

[54] CCD WITH NUMBER OF CLOCKING SIGNAL PHASES INCREASING IN LATER CHARGE TRANSFER STAGES

[75] Inventor: Hammam Elabd, Mercer County, N.J.

[73] Assignee: RCA Corporation, Princeton, N.J.

[21] Appl. No.: 680,883

[22] Filed: Dec. 12, 1984

[51] Int. Cl.[4] .............................................. H04N 3/14
[52] U.S. Cl. ...................................... 358/213; 357/24
[58] Field of Search ....................... 358/213, 212, 209; 357/24 LR

[56] References Cited

U.S. PATENT DOCUMENTS

| | | | |
|---|---|---|---|
| 3,801,884 | 4/1974 | Sequin | 317/235 R |
| 4,507,684 | 3/1985 | Battson | 358/213 |
| 4,525,743 | 6/1985 | Wood, Jr. et al. | 358/213 |
| 4,527,199 | 7/1985 | Kinoshita et al. | 358/213 |

Primary Examiner—Gene Z. Rubinson
Assistant Examiner—Stephen Brinich
Attorney, Agent, or Firm—Joseph S. Tripoli; George E. Haas; Allen LeRoy Limberg

[57] ABSTRACT

The charge handling capability of successive charge transfer stages in a charge transfer channel is increased beyond a certain point in the channel. This is done by increasing the number of forward clocking signal phases applied to charge transfer stages beyond this point as compared to the number of forward clocking signal phases applied to charge transfer stages before this point.

6 Claims, 5 Drawing Figures

CCD WITH NUMBER OF CLOCKING SIGNAL PHASES INCREASING IN LATER CHARGE TRANSFER STAGES

The invention relates to charge coupled devices (CCD's).

BACKGROUND OF THE INVENTION

Solid state imagers often employ charge coupled devices. A particularly well-known such imager is the field transfer type CCD imager. In this imager a radiant energy image is projected during image integration intervals into an image (or A) register comprising a plurality of parallel charge transfer channels. These image integration intervals occur during the field trace portions of video signal generated from video signal samples supplied from the imager as output signal. During these image integration intervals static clocking signals are applied to the parallel charge transfer channels in the A register. Charge generated by photoconversion of the radiant energy image, either in these charge transfer channels or the underlying bulk semiconductor, is accumulated in charge packets representative of the intensities of respective elements of the radiant energy image. These charge packets are accumulated in the respective charge transfer stages of A register charge transfer channels.

During field transfer intervals, which occur during the field retrace portions of video signal, dynamic clocking signals are applied to the parallel charge transfer channels in the A register to transfer the accumulated charge packets serially out of each charge transfer channel. The charge packets are transferred serially into corresponding ones of the parallelled charge transfer channels of a field storage (or B) register, which is shielded from exposure to radiant energy. This field transfer is accomplished in prior field transfer type CCD imagers by foward clocking the A and B registers in synchronism with each other.

During the field trace portion of video signal following each field transfer, the charge packets, accumulated during the preceding field trace and subsequently transferred to the B register, are transferred out of the B register in the following way. During each line retrace interval the B register is forward clocked to advance all charge packets stored therein ahead one charge transfer stage, transferring out the previously last row of charge packets stored therein, which row represents a line of image element samples to be converted into a line of video signal output voltage samples. Towards this end, the row of charge packets displaced from B register during line retrace are loaded in parallel into respective charge transfer stages of a charge transfer channel operated as an output line (or C) register.

During line trace the C register is forward clocked at pixel scan rate, as a CCD shift register, to convert the row of parallelly loaded charge packets to a serial-in-time format. The charge packets serially supplied at pixel scan rate from the C register are supplied to a charge sensing output stage, or electrometer. This output stage responds to the charge packets to provide, in conventional raster scan order, video output signal samples related to the intensity of radiant energy image elements.

There is a desire for obtaining higher resolution in CCD imagers, which can be satisfied in a practical way using the state-of-the-art processing limitations on maximum die sizes and on minimum element sizes only if one uses a plurality of abutted CCD imagers. CCD imagers of field transfer type could be readily abutted in the direction of line scan—since their A, B and C registers can be confined within a pair of boundaries flanking the parallelled charge transfer channels of the A and B registers—if it were not for the difficulty that the charge sensing stage at the output end of the C register extends beyond one of the boundaries. It has been proposed to solve the problem of the overextending charge sensor stage by introducing a narrowing of the charge transfer channels of the B register along a portion of their lengths, so a shorter C register can be used. The shortened C register and the ensuing charge sensing stage can then be readily confined within the two boundaries flanking the sides of the A and B registers.

The narrowing of the final portions of the B register charge channels, or their gradual narrowing over their entire length, tends to reduce the charge handling capability of the charge transfer channels in their narrower portions.

One may attempt to solve this problem by increasing potential energy well depth in the narrower portions of the charge transfer channels by increasing gate electrode clocking voltage swing. To increase clocking voltage swing for the entire B register is costly in terms of clocking power, and to increase clocking voltage swing only over a portion of the B register introduces undesirable complexity into clocking voltage generation. Either scheme goes against the current desire to reduce clocking voltage clocking power to ease clock driver transistor requirements.

One may attempt to increase charge handling capability of the narrower portions of the B register charge transfer channels by lengthening the "pitch", the length of the charge transfer stage, by increasing the lengths of the gate electrodes in each charge transfer stage. But this reduces the maximum rate at which efficient charge transfer through the B register can be made, and undesirably increases the duration of field transfer.

One may attempt to increase the charge handling capability of the charge transfer stages in the narrower portions of the B register together with the preceding charge transfer stages in the A and B registers, by increasing the number of clocking signal phases in both registers. This has the problem that for given minimum gate length and pixel resolution requirement in the direction of line advance, the A register size is increased, requiring the optics systems that convey the image to the A register to convey a larger image. The increased A register and B register size for given minimum gate length and pixel resolution requirement takes up a larger semiconductor die, which is undesirable from the standpoint of semiconductor manufacturing usable yield.

SUMMARY OF THE INVENTION

The invention embodied in a charge transfer structure, such as the narrowing B register charge transfer channel described above or a charge merging stage by way of further example, where the charge handling capbility of successive charge transfer stages is increased at a point along its length, this being done increasing the number of forward clocking signal phases after that point as compared to the number of forward clocking signal phases prior to that point.

DETAILED DESCRIPTION

Figure 1:
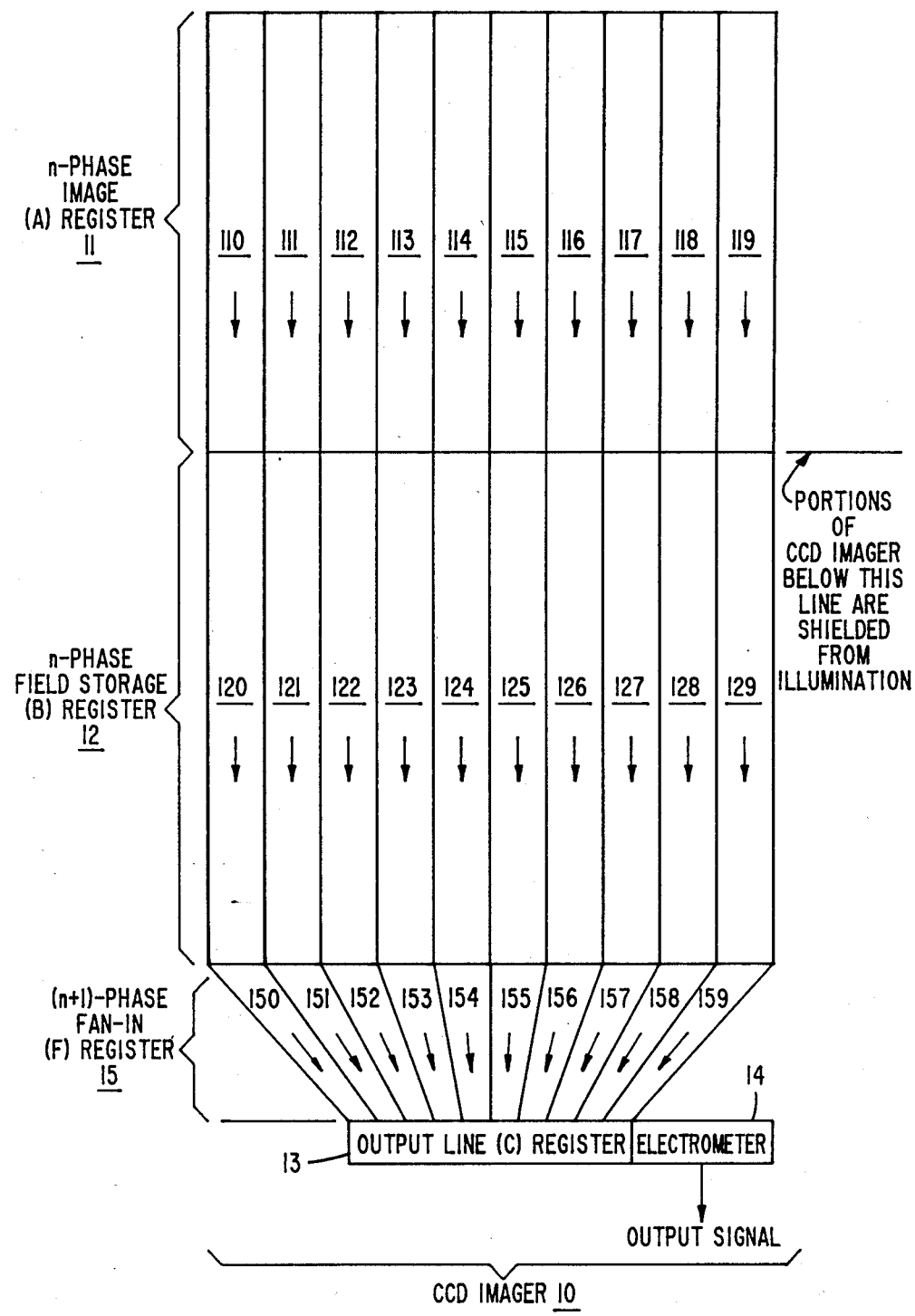
FIG. 1 is a stylized plan view of a buttable CCD imager of field transfer type in which the invention can be embodied.

FIG. 1 shows in plan view a CCD imager 10 which is designed to be abuttable with others of its like. CCD imager 10 is of field transfer type having an image (or A) register 11, a field storage (or B) register 12, an output line (or C) register 13, and a charge sensing output stage or electrometer 14. The B register 12 and C register 13 are shielded from illumination. The departure from conventional construction is the inclusion of a fan-in (or F) register 15 for conveying charge packets from the B register 12 to the C register 13 so C register 13 may be compressed in length. This allows electrometer 14 to be placed at the output end of C register 13 without extending past A register 11 and B register 12 in the rightward direction when viewing FIG. 1 normally. This facilitates the rectangular semiconductor die on which the CCD imager 10 is constructed having edge boundaries coincident respectively with the right sides of A register 11 and B register 12 and with their left sides, so CCD imager 10 may abut on its left and right sides with similar CCD imagers.

While A register 11 and B register 12 typically have as many as a few hundred parallelled charge transfer channels in them, and C register 13 has a corresponding number of charge transfer stages in its charge transfer channel, drafting constraints make the depiction of such an imager difficult. Accordingly, A register 11 is shown as comprising only ten parallelled charge transfer channels 110–119 arranged for receiving during field transfer a forward clocking signal having a plurality n of successive clocking phases. The arrows in charge transfer channels 110–119 indicate the direction of charge packet advance during field transfer. B register 12 is shown as comprising only ten parallelled charge transfer channels 120–129 having respective input ports connected to the output ports of A register 11 charge transfer channels 110–119 respectively. The arrows in charge transfer channels 120–129 indicate the direction of charge packet advance during field transfer when B register 12 receives n-phase forward clocking signal in synchronism with A register 11 forward clocking signal. F register 15 is shown as comprising only ten charge transfer channels 150–159 having respective input ports connected to the output ports of B register 12 charge transfer channels 120–129 respectively, having respective output ports connected to load successive respective charge transfer stages of C register 13, and being narrower at their output ports than at their input ports to accommodate the compression in length of C register 13 to achieve buttability of CCD imager 10. The direction of charge packet advance through F register 15 during field transfer is shown by arrows in its charge transfer channels 150–159.

In accordance with the invention, F register 15 is forward clocked in a greater number of phases than the preceding B register 12. B register 12 and F register 15 are forward clocked together with A register 11 at relatively fast rate during the field transfer interval that takes place during the field retrace portions of the video signal defined by output voltage samples from electrometer 14. This forward clocking is of sufficient duration to transfer the charge packets descriptive of image element intensity, previously accummulated in A register 11 from photocharge response to an image, from A register 11 into positions in the B register 12 or in both B register 12 and F register 15. During each line retrace portion of the video signal defined by output voltage samples from electrometer 14, B register 12 and F register 15 are forward clocked to advance each line of charge packets forward one charge transfer stage. The line of charge packets advanced, so as to transfer out of the output ports of charge transfer channels 151–159, is transferred into the successive charge transfer stages of C register 13, in which forward clocking is halted. During each ensuing line trace portion of the video signal defined by output voltage samples from electrometer 14, B register 12 and F register 12 forward clocking is halted. C register 13 is forward clocked at pixel scan rate to serially read out to the input circuit of electrometer 14 the charge packets parallelly read into its charge transfer stages during the preceding line retrace.

Forward clocking F register 15 in a greater number of clock phases increases the charge handling capability of its charge transfer channels. During the multiple-phase forward clocking process at times at least two successive gate electrodes in each charge transfer stage must simultaneously have an in-channel potential energy barrier induced thereunder. So for multiple-phase clocking in a number n of successive phases only an $(n-2)/n$ fraction of the charge transfer channel can be occupied by potential energy wells for the storage of charge, assuming the gate electrodes receptive of the various clocking phases to have equal length l. Three-phase clocking makes one-third of the charge transfer stage length 3l available for occupation by potential energy well, so well length is l. Four-phase clocking makes one-half of the charge transfer stage length 4l available for occupation by potential energy well, so well length is 2l. So for the same charge transfer channel width (which defines well width) and clocking voltage amplitude swing (which defines well depth) four-phase forward clocking provides twice the well volume, and therefore twice the charge handling capability, as three-phase forward clocking. Continuing this analysis, it can be shown charge handling capability increases in direct relationship with the number of forward clocking phases in excess of two, if gate length l, channel width, and clocking voltage amplitude swing are maintained the same as the number of clock phases is increased.

The small number of parallelled charge transfer channels of the A register 11, B register 12, and F register 15 and some exageration of the size of electrometer 14 made as concessions to drafting limitations, tend to exagerate the length of F register 15 charge transfer channels and to exagerate the compression of C register 13 length. So the $(n+1)/n$ increase in charge handling capability of F register 15 by going from n-phase to (n+1)-phase forward clocking can be sufficient, even where n is more than three, that the charge handling capability of the B register 12 charge transfer stages, rather than that of the F register 15 charge transfer stages, is the limiting factor in determining the dynamic range of the output signal samples supplied by electrometer 14. This assumes the gate electrodes in both B register 12 and F register 15 to have the same length l. This allows design for minimum-size B register 12 charge transfer stages and excess-size F register 15 charge transfer stages, rather than the other way around. Since there are a substantially greater number of charge transfer stages in the B register 12 than in the F register 15, F register 15 being proportionately shorter than shown if C register 13 compression is not actually as pronounced as is shown, this allows an overall better utilization of semiconductor die area.

In a fan-in register, such as F register 15, the path of charge transfer on average is askew from the direction in which gate electrodes succeed each other, which increases the average distance over which charge transfer must be made and tends to reduce charge transfer efficiency. Increasing the number of clock phases provides a countervailing tendency of greater charge transfer efficiency.

Making the gate electrodes the same length in the charge transfer stages of a CCD provides the best charge handling capability, charge handling capability depending on how short the longest pair of successive gate electrodes is compared to the pitch of the CCD. The gate electrodes may have to be substantially equal in length, rather than being of equal lengths, however, particularly when design considerations force a prescribed pitch. In a field transfer type of CCD imager the pitch of the A register is determined by the image size having to conform to commercially available optics systems and by the number of active lines per television field having to conform to a television standard; the pitch of the B register is designed to match the pitch of the A register. The steppers used in semiconductor wafer layout have a quantization error that may prevent the division of the prescribed pitch into the number of equal-length gate electrode positions desired. For example, a twenty-micron pitch may be divided for three phases into seven-micron, seven-micron and six-micron segments, if stepper resolution of one micron prevents equal division. Successive gate electrodes are usually formed in different processing steps, such as being in three successive polysilicon layers by way of example. This also interferes with achieving exactly equal gate electrode lengths, and one must be satisfied with substantially the same gate electrode lengths.

Figure 2:
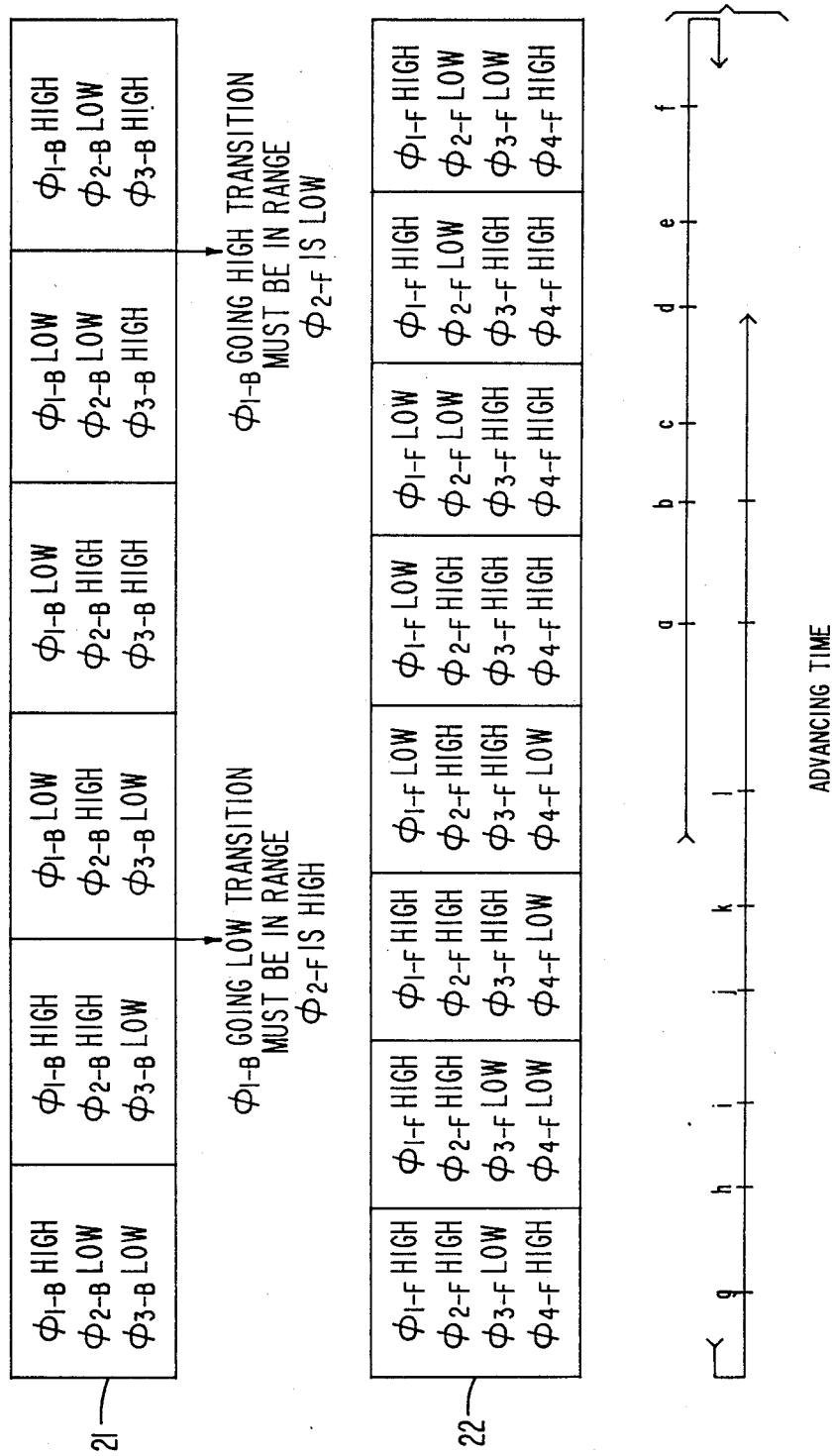
FIG. 2 is a timing diagram of the forward-clocking of an earlier portion of a charge transfer channel in three-phases and of a subsequent later portion of the charge transfer channel in four-phases, in accordance with one embodiment of the invention.

FIG. 2 is a timing diagram showing how B register 12 may be forward clocked in three phases to transfer charge packets into F register 15 forward clocked in four phases. The three successive-in-time phases $\phi_{1-B}$, $\phi_{2-B}$, $\phi_{3-B}$ of forward clocking for B register 12 are shown as being of equal duration with regard to each other, with each pair of two successive phases exhibiting the same overlap as the other two pairs of two successive phases, in the one of cycle 21, the recurrent B register 12 clocking signal shown in FIG. 2. The four successive-in-time phases $\phi_{1-F}$, $\phi_{2-F}$, $\phi_{3-F}$, $\phi_{4-F}$ of forward clocking for F register 15 are shown of being of equal duration with regard to each other. Each pair of two successive ones of these phases exhibits the same overlap as the other three pairs of successive phases, in the one cycle 22 of the recurrent F register 15 clocking signal shown in FIG. 2.

In any case the cycle times for B register 12 and F register 15 clocking signals must be the same. B register clocking cycle must not be longer than F register clocking cycle, in order to avoid piling up of charge in B register 12 during some cycles. F register clocking cycle must not be longer than B register clocking cycle, in order to avoid failure to provide a fully transferred charge packet in each cycle of F register clocking. The other constraints that must be met are two in number. Firstly, the initial gate electrode of F register 15 must be relatively high in voltage to induce a potential energy well thereunder when the final gate electrode of B register 12 goes relatively low in voltage to induce a rising potential energy barrier thereunder to push a charge packet out of B register 12 and into F register 15. Secondly, the initial gate electrode of F register 15 must be relatively low in voltage to induce a potential energy barrier thereunder to prevent the slipping back of a charge packet from the F register 15 into B register 12 when the final gate electrode of B register 12 becomes relatively high to induce a potential energy well thereunder.

A linear time scale "folded" by measuring time modulo the cycle duration appears at the bottom of FIG. 2 timing diagram. Different times a−l correspond to subfigure identification alphanumerics in the FIG. 3 sequence of in-channel potential energy profiles.

Figure 3:
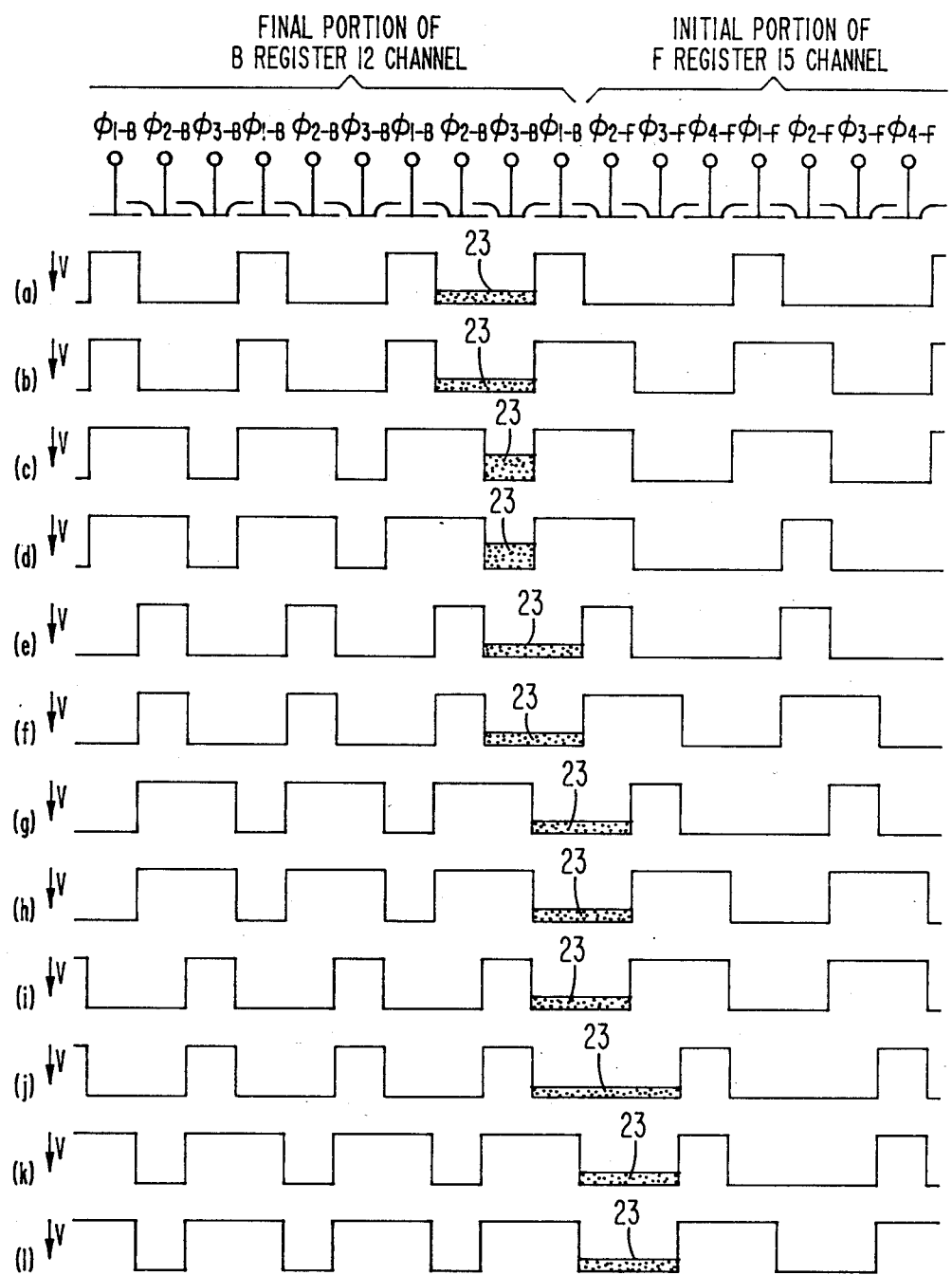
FIG. 3 shows a sequence of in-channel potential energy profiles associated with forward clocking in accordance with FIG. 2.

FIG. 3 shows a sequence of in-channel potential energy profiles for the final portion of a charge transfer channel in three-phase-clocked B register 12 and the initial portion of that charge transfer channel as it continues into four-phase-clocked F register 15. Consideration of FIG. 3 should enable the reader to understand in general how a CCD shift register clocked in a number n of phases can be arranged to advance charge packets into a succeeding shift register clocked in a larger number m of phases, without destroying the information content of the charge packets.

At the top of FIG. 3, in accordance with the conventional way of diagramming in-channel potential energy profiles is a representation of the gate electrode structures used for inducing the profiles. A final portion of the B register 12 gate electrode structure sequence is shown. The first, second, and third successive-in-time phases of B register 12 forward clocking are denominated $\phi_{1-B}$, $\phi_{2-B}$ and $\phi_{3-B}$, respectively. $\phi_{1-B}$ is schematically shown being applied to gate electrodes formed in a first polysilicon layer; $\phi_{2-B}$ is schematically shown being applied to gate electrodes formed in a second polysilicon layer; and $\phi_{3-B}$ is schematically shown as being applied to gate electrodes formed in a third polysilicon layer. An initial portion of the F register 15 gate electrode structure sequence following the last B register 12 gate electrode, receptive of $\phi_{1-B}$ clock phase, is also shown. The first, second, third and fourth successive-in-time phases of F register 15 forward clocking are denominated $\phi_{1-F}$, $\phi_{2-F}$, $\phi_{3-F}$ and $\phi_{4-F}$ respectively. $\phi_{1-F}$ is schematically shown as being applied to gate electrodes formed in the first polysilicon layer; $\phi_{2-F}$ and $\phi_{4-F}$ are schematically shown as being applied to separate sets of gate electrodes both formed in the second polysilicon layer; and $\phi_{3-F}$ is schematically shown as being applied to gate electrodes formed in the third polysilicon layer. The initial gate electrode in F register 13 is in the set of gate electrodes receptive of $\phi_{2-F}$ clock phase and located in the second polysilicon layer to overlap the final gate electrode in B register 12 receptive of $\phi_{1-B}$ phase and located in the first polysilicon layer.

FIG. 3(a) shows a charge packet 23 in stipple in the final charge transfer stage of B register 12. FIGS. 3(b)–3(l) shows the successive forward clocking steps to transfer charge packet 23 into the initial charge transfer stage of F register 15.

Figure 4:
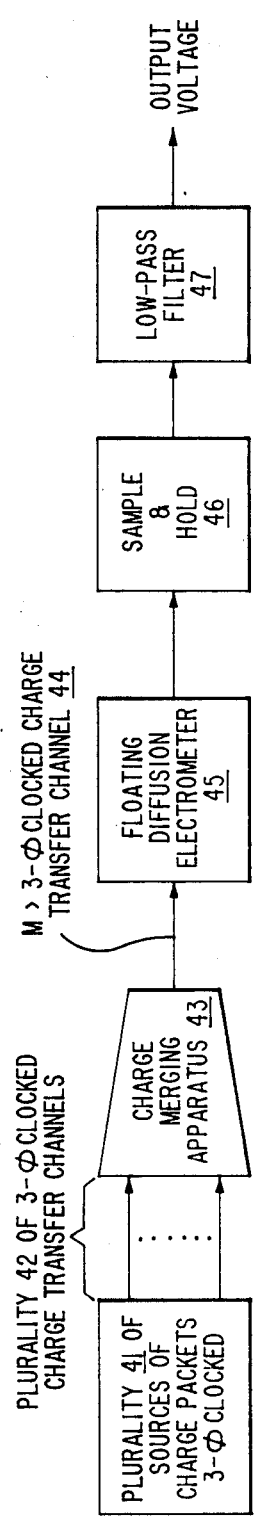
FIG. 4 is a block diagram of apparatus using charge merging apparatus in accordance with the invention.

FIG. 4 is a block schematic of a system using the invention in connection with charge merging. A plurality 41 of sources of charge packets supply charge packets in three-phase-clocking, which are conveyed via respective ones of a plurality 42 of three-phase-clocked charge transfer channels to respective input ports of charge merging apparatus 43 clocked three-phase at its input ports. Charge merging apparatus 43 is clocked with a larger number m of clock phases at its output port connected by an m-phase-clocked charge transfer channel 44 to a floating-diffusion electrometer 45. Clocking charge transfer channel 44 in m phases, rather than in only three phases, permits channel 44 to be narrower for given in-channel voltage. Doing this, rather than widening the charge transfer channels to accommodate the larger merged charge packets, increases the signal-to-noise ratio of electrometer 45 by reducing shot noise during sensing. Electrometer 45 voltage samples supplied during charge sensing are sampled and held in circuit 46, then low-pass filtered in filter 47, in accordance with normal practice, to yield a substantially continuous output voltage with signal-to-noise ratio improved over prior art charge merger response.

Figure 5:
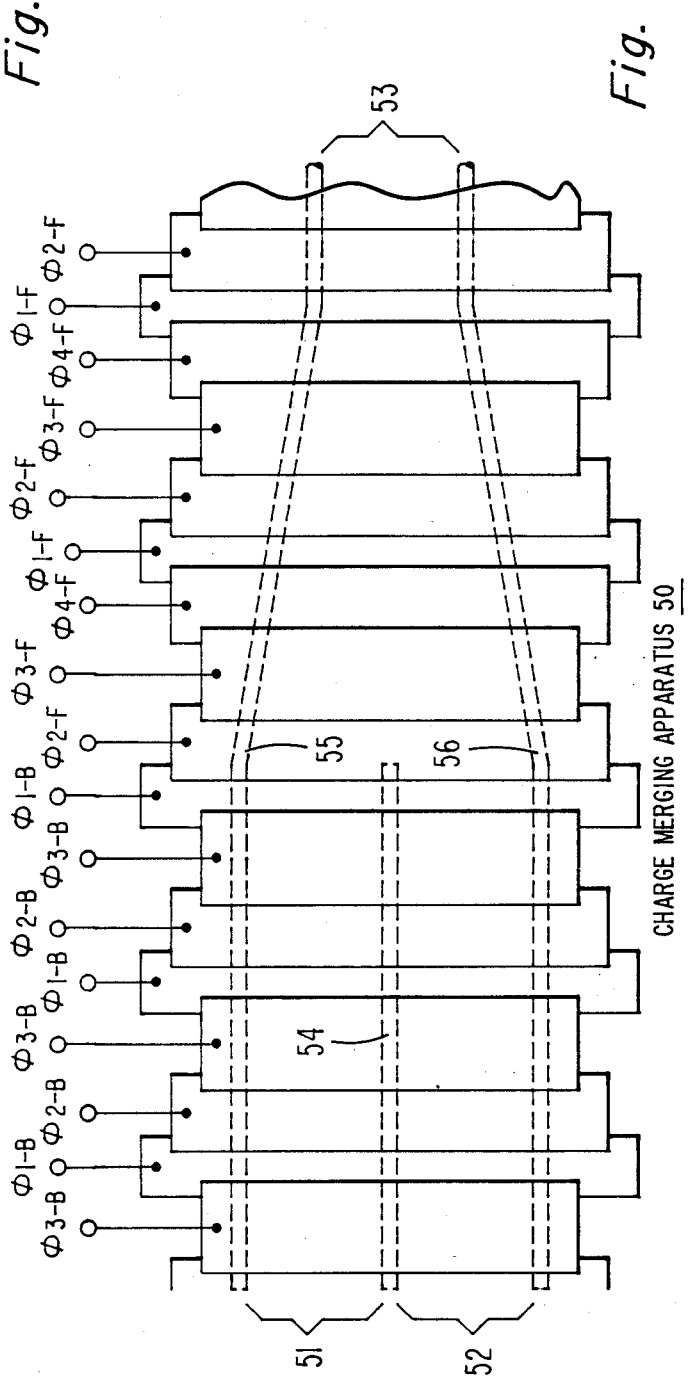
FIG. 5 is a plan view showing the layout of typical charge merging apparatus embodying the invention.

FIG. 5 shows in plan view layout a representative one 50 of the FIG. 4 charge merging apparatus 43 in which charge packets taken in with three-phase clocking from two input charge transfer channels 51 and 52 are merged to supply output charge packets with four-phase clocking from output charge transfer channel 53. Input charge transfer channels 51 and 52 are separated from each other on their bottom and top boundaries, respectively by a channel stop structure 54 (shown in dashed outline) between them, until their merger after the point where channel stop structure 54 ends in the middle of FIG. 5. Up to this point apparatus 50 uses a three-phase structure of overlapped gate electrodes in first, second and third layers of polysilicon respectively receptive of $\phi_{1-B}$, $\phi_{2-B}$ and $\phi_{3-B}$ forward clocking signals corresponding to those shown in FIG. 3. After this point apparatus 50 uses a four-phase structure of over-lapped gate electrodes in first, second, third and second layers of polysilicon respectively receptive of $\phi_{1-F}$, $\phi_{2-F}$, $\phi_{3-F}$ and $\phi_{4-F}$ clocking signals corresponding to those shown in FIG. 3. The upper boundaries of input charge transfer channel 51 and output charge transfer channel 53 are defined by a continuous channel stop 55 (shown in dashed outline). The lower boundaries of input charge transfer channel 52 and output charge transfer channel 53 are defined by a continuous channel stop 56 (shown in dashed outline). The four-phase clocking of output charge transfer channel 53 makes its charge handling capability equal to the sum of the charge handling capabilities of input charge transfer channels 51 and 52, despite equal length gate electrodes in these charge transfer channels and despite their equal widths.

Similarly, one may arrange for five-phase-clocking of the output charge transfer channel of a three-input-charge-transfer-channel charge merging apparatus; six-phase-clocking of the output charge transfer channel of a four-input-charge transfer-channel charge merging apparatus; etc.

The number of output clocking phases can be chosen to take into account unequal charge handling capabilities of input charge transfer channels owing to their being of unequal width. Charge merger stages with input charge transfer channels with dissimilar numbers of phases of input clocking signals, none larger than the number of phases of output clocking signal, are possible. The transitions of the input clocking signals may be altered somewhat in timing to occur synchronously with transitions of the output clocking signals, or the timing of the output clocking signal may be altered somewhat for the same purpose. All these variants are within the purview of the invention.

What is claimed is:

1. A CCD shift register comprising:

a first CCD charge transfer channel portion having a plurality of successive charge transfer stages of a given length $nl_1$ in the direction of charge transfer, each stage having a succession of n respective gate electrodes on average of length $l_1$, successively ordinally numbered first through $n^{th}$, n being a positive integer three or more;

a second CCD charge transfer channel portion having a plurality of successive charge transfer stages of a given length $ml_2$ in the direction of charge transfer, each stage having a succession of m respective gate electrodes on average of length $l_2$ successively ordinally numbered first through $m^{th}$, m being a positive integer larger than n;

a connection of the output port of the final charge transfer stage in said first CCD charge transfer channel portion to the input port of the initial charge transfer stage in said second CCD charge transfer channel portion;

means for applying to said first CCD charge transfer channel portion a first forward clocking signal with n successive phasings respectively having consecutive ordinal numbers first through $n^{th}$, each phasing of which said first forward clocking signal is applied to the gate electrodes of said first CCD charge transfer channel portion having the same ordinal number as that phasing does;

means for applying to said second CCD charge transfer channel portion a second forward clocking signal with m successive phasings respectively having consecutive ordinal numbers first through $m^{th}$, each phasing of which said second forward clocking signal is applied to the gate electrodes of said second CCD charge transfer channel portion having the same ordinal number as that phasing does, the cycle of m successive phases of said second forward clocking signal being of the same duration as the cycle of n successive phases of said first forward clocking signal, said second forward clocking signal being timed respective to said first forward clocking signal such that the voltage on the final gate electrode of said first CCD charge transfer channel portion makes each transition between its high and low states when the voltage on the initial electrode of said second CCD charge transfer channel portion is in its high state and such that the voltage on the final gate electrode of said first CCD charge transfer channel portion makes each transition between its low and high states when the voltage on the initial electrode of said second CCD charge transfer channel portion is in its high state and such that the voltage on the final gate electrode of said first CCD charge transfer channel portion makes each transition between its low and high states when the voltage on the initial electrode of said second CCD charge transfer channel portion is in its low state.

2. A CCD shift register as set forth in claim 1 narrowing along the charge transfer channel formed at least in part by the connection of the output port of the final charge transfer stage in said first CCD charge transfer channel portion to the input port of the initial charge transfer stage in said second second CCD charge transfer channel portion, so that said charge transfer channel is narrower in said second charge transfer channel portion than in said first charge transfer channel portion.

3. A CCD shift register as set forth in claim 2 wherein the gate electrodes in said charge transfer channel are all substantially the same in length.

4. In combination:
a plurality of CCD charge transfer channels with contiguous respective output ports and with n-phase forward clocking, n being a positive integer three or more; and
a CCD converging-width charge transfer device having a relatively wide input port connected for receiving charge packets from the output ports of said plurality of CCD charge transfer channels, having a relative narrow output port, and being forward-clocked in m phases, m being a positive integer greater than n.

5. In combination:
a plurality of CCD charge transfer channels with respective output ports and with n-phase forward clocking, n being a positive integer three or more; and
a CCD fan-in register having a plurality of input ports respectively matched in width to the respective ones of the output ports of said plurality of CCD charge transfer channels to which the fan-in-register input ports respectively connect, having a plurality of relatively narrow output ports as compared to its input parts, and being clocked in m phases, m being a positive integer greater than n.

6. A combination as set forth in claim 5 included within a CCD imager of field transfer type comprising:
a field storage register including said plurality of CCD charge transfer channels in a parallel array shielded from illumination, with their output ports in parallel alignment and with input ports in parallel alignment;
a further plurality of CCD charge transfer channels, arranged parallelly and exposed to illumination, that constitute an image register with output ports connected to respective ones of the input ports of said CCD charge transfer channels in said field storage register;
an output line register having a succession of charge transfer stages loaded in parallel from the output ports of said fan-in register and operated as a shift register following loading; and
a charge sensing output stage connected to sense charge in the charge transfer stage of said output line register last during shift register operation.

* * * * *